United States Patent
Sawada et al.

[11] Patent Number: 6,129,855
[45] Date of Patent: Oct. 10, 2000

[54] METHOD OF MANUFACTURING MAGNETIC HEAD SLIDER, AND GUIDE PLATE USED THEREFOR

[75] Inventors: Shigetomo Sawada; Yoshinore Watanabe; Tadamasa Takagi; Shigeo Terashima; Hisami Izawa, all of Kawasaki, Japan

[73] Assignee: Fujitsu Ltd., Kawasaki, Japan

[21] Appl. No.: 08/984,631

[22] Filed: Dec. 3, 1997

[30] Foreign Application Priority Data

| Dec. 9, 1996 | [JP] | Japan | 8-328548 |
| Oct. 17, 1997 | [JP] | Japan | 9-285561 |

[51] Int. Cl.⁷ ..................................................... B44C 1/22
[52] U.S. Cl. ............................... 216/22; 216/56; 360/103
[58] Field of Search ............................ 216/22, 27, 33, 216/41, 56; 360/103

[56] References Cited

U.S. PATENT DOCUMENTS 4,624,048  11/1986  Hinkel et al. ..................... 216/22 X

FOREIGN PATENT DOCUMENTS

| 640957A1 | 3/1995 | European Pat. Off. |
| 667310 | 3/1994 | Japan . |
| 6150276 | 5/1994 | Japan . |
| 6236508 | 8/1994 | Japan . |
| 6309616 | 11/1994 | Japan . |
| 714137 | 1/1995 | Japan . |
| 773425 | 3/1995 | Japan . |
| 8-315341 | 11/1996 | Japan . |

*Primary Examiner*—William Powell
*Attorney, Agent, or Firm*—Greer, Burns & Crain, Ltd.

[57] ABSTRACT

A method of manufacturing a magnetic head slider from a flying surface pattern formed on one surface of a long and slender rectangular parallelepiped slider block having a plurality of thin film magnetic head elements aligned in a row. The method includes preparing an arrangement jig including a guide plate and an adhesive rubber plate which adheres onto a lower surface of the guide plate by its adhesive force. The method also includes placing blocks in the accommodation holes on the guide plate in such a manner that the surface of each block on which a pattern is formed is directed upward and each block is fixed by the adhesive force of the rubber plate. The rubber plate is then peeled off after an upper surface of the arrangement jig has been set upside down. Pouring and penetrating hardening liquid into clearances formed between the accommodation holes on the guide plate and the blocks is the next step. The guide plate is then fixed onto a base plate and a pattern is formed on the surface of each block.

18 Claims, 10 Drawing Sheets

METHOD OF MANUFACTURING MAGNETIC HEAD SLIDER, AND GUIDE PLATE USED THEREFOR

BACKGROUND OF THE INVENTION

1. Field of the Invention

The present invention relates to a method of manufacturing a magnetic head slider used for a magnetic disk unit. Also, the present invention relates to a guide plate used in the process of manufacturing the magnetic head slider.

2. Description of the Related Art

On one surface of a magnetic head slider, there is formed a special flying surface pattern of fine recesses. The flying surface pattern on the surface has a direct influence on the flying stability of the slider, and the recording density of the slider is affected by the flying surface pattern. Therefore, the formation of the flying surface pattern is very important. In order to mass-produce the above magnetic head sliders, the following method is adopted. On a wafer base plate, there are provided a plurality of thin film magnetic head elements which are formed and arranged by means of thin film processing. A rectangular parallelepiped slider block (referred to as a block hereinafter) in which the elements are aligned in a row is cut out from the wafer base plate. A flying pattern is formed on the rectangular parallelepiped slider block. After the formation of the pattern, the block is cut into individual head sliders.

Concerning the formation of the pattern on the block, the following methods are disclosed in Japanese Unexamined Patent Publication Nos. 6-309616, 6-236508, 7-14137 and 7-73425. According to the methods, a large number of blocks are arranged at regular intervals on an upper surface of a flat base plate and fixed onto the flat base plate by adhesive. A resist film is coated in the blocks, and a mask pattern is formed by means of exposure and development. Then the thus formed mask pattern is subjected to ion-milling (etching processing), so that a flying surface pattern is formed on the block.

However, the following problems may be encountered in the above formation methods. Since the blocks are not directly connected with each other, it is impossible to obtain a sufficiently high positioning accuracy, and an exposed side of the block tends to be damaged by a shock caused by ions. In order to simply solve the above problems, an adhesive agent is made to flow between the blocks so as to fill the clearances. In this case, in order to prevent the deterioration of the pattern, it is necessary to clean a pattern formation surface of the block with a cotton swab soaked with solvent. In this cleaning work, there is a tendency for the adhesive agent provided between the blocks to be dissolved, so that the side of the block is exposed. For the above reasons, this cleaning work requires great skill and complicated labor.

Japanese Unexamined Patent Publication No. 6-67310 discloses the following method. There is prepared a holder which is composed in such a manner that an adhesive tape is made to adhere onto a back side of a sheet on which a large number of holding holes capable of accommodating blocks are continuously formed at regular intervals. A block is accommodated in each accommodating hole of the holder and fixed by the adhesive tape. A flying surface of this block is coated with photosensitive resist. This photosensitive resist is exposed to light, and then the exposed surface is developed, fixed and dried, so that the flying surface pattern can be formed. Thus formed flying surface pattern is subjected to etching, so that the flying surface pattern can be formed. However, this method has the same problem as that of the conventional method described before, that is, a side of the block is exposed, so that the side of the block tends to be damaged in the process of etching.

The sixth example described in Japanese Unexamined Patent Publication No. 6-150276 discloses the following technique. A surface of a block to be processed is set downward, and the block is fixed onto a jig. Then, a C-shaped jig used for processing is set on the block, and an adhesive agent is filled into clearances between the blocks being fed from a hole formed on a back side of the jig used for processing. However, according to the above technique, an adhesive agent is filled (penetrates) from the hole into a tightly closed space formed by the upper and the lower jig and both blocks. Therefore, it is difficult to sufficiently fill (penetrate) the adhesive agent into the space. Consequently, the side of the block cannot be protected.

SUMMARY OF THE INVENTION

The object of the present invention is to provide a method of mass-producing magnetic head sliders of high quality at low cost by which the sides of the blocks can be simply and sufficiently protected in the process of etching. Also, it is another object of the present invention to provide a guide plate used in the above method of mass-producing magnetic head sliders.

In order to solve the above problems, the present invention provides a method of manufacturing a magnetic head slider by which a flying surface pattern is formed on one surface of a long and slender rectangular parallelepiped slider block in which a plurality of thin film magnetic head elements are aligned in a row, comprising the steps of: (i) preparing an arrangement jig including a guide plate on which a plurality of penetrating accommodation holes for accommodating slider blocks are formed and also including an adhesive rubber plate which adheres onto a lower surface of the guide plate by its adhesive force; accommodating the slider blocks in the accommodation holes on the guide plate of the arrangement jig in such a manner that the surface of each slider block on which a pattern is to be formed is directed upward and each slider block is fixed by the adhesive force of the rubber plate; (ii) peeling off the rubber plate after an upper surface of the arrangement jig has been covered with film; (iii) pouring and penetrating a hardening liquid into clearances formed between the accommodation holes on the guide plate and the slider blocks so as to coat the sides of the slider blocks and connect the slider blocks with the guide plate; (iv) fixing the entire members onto a predetermined base plate after the penetrating liquid has been hardened; (v) and forming a pattern on the surface of each slider block on which the pattern is to be formed by means of exposing, developing and etching. In the above construction, the guide plate is thinner than the slider block by a predetermined size. The guide plate is made of a metallic plate such as a copper plate.

The rubber plate is an adhesive plate made of adhesive material such as silicon rubber or fluorine rubber. The clearance formed between each accommodation hole on the guide plate and each slider block accommodated in the accommodation hole is larger than a clearance formed in a portion of the accommodation hole in which the slider block is positioned and restricted so that the penetration of a liquid can be facilitated in step (iii). A run-off portion connected to the accommodation hole is formed at each of the four corners of the accommodation hole of the guide plate so that the slider block cannot be broken by the contact with the accommodation hole and/or the penetration of liquid can be facilitated in step (iii).

Film coating is conducted in step (ii) by means of laminate processing of resist film. The hardening penetrating liquid used in step (iii) is a photosensitive resist liquid. The hardening penetrating liquid used in step (iii) is a cyanoacrylate adhesive agent.

Step (v) further includes the steps of: removing a film which covers a surface on which the pattern of the slider block is to be formed; coating a resist film; conducting exposure, development and etching on the resist film so as to form the pattern.

A resin sheet to protect the rubber sheet is made to adhere onto a lower surface of the arrangement jig by an adhesive force of the rubber plate.

The present invention is to provide a guide plate comprising a plurality of penetrating holes to accommodate a plurality of slider blocks, wherein the guide plate is used, in the process of manufacturing magnetic head sliders, for arranging a plurality of long and slender rectangular parallelepiped slider blocks in a row in parallel with each other, in which a plurality of thin film magnetic head elements are aligned in a row. The guide plate is preferably thinner than the slider block by a predetermined size. The guide plate is preferably made of a metallic plate. Further, it is preferable that a long and slender slit to absorb the deformation of the slider block is formed between the through-holes on the guide plate.

BRIEF DESCRIPTION OF THE DRAWINGS

These and other objects of the present invention will become apparent from the following detailed description of the preferred embodiment of the invention, taken in connection with the accompanying drawings.

In the drawings.

DESCRIPTION OF THE PREFERRED EMBODIMENTS

Referring to the accompanying drawings, an embodiment of the present invention will be explained as follows.

Figure 1:
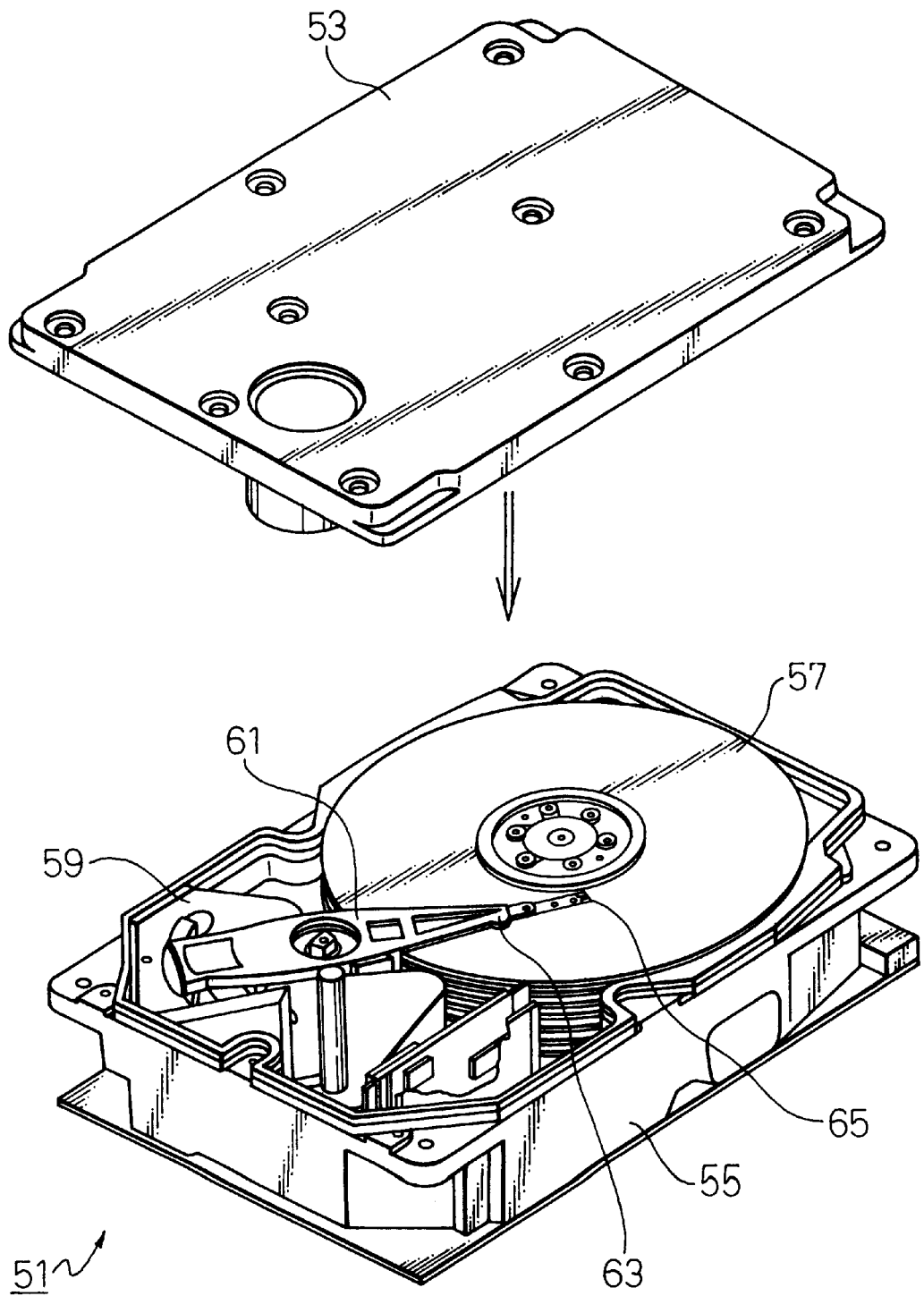
FIG. 1 is an overall perspective view of an example of the rotary actuator type magnetic disk unit of the present invention.

FIG. 1 is an overall perspective view of an example of a rotary actuator type magnetic disk unit to which the present invention is applied, wherein this view shows a state of the magnetic disk unit, the cover of which is removed so that the inside of the unit can be seen. It should be noted that the present invention is not limited to this specific rotary actuator type magnetic disk unit. It is possible to apply the present invention to other types of magnetic disk units such as a linear actuator type magnetic disk unit. Further, the present invention is not limited to the magnetic disk unit, but it is possible to apply the present invention to other disk units such as optical disk units.

In FIG. 1, there is provided a magnetic disk unit 51, which includes a box-shaped enclosure 55 from which the cover 53 is removed so that the inside of the enclosure 55 can be seen. On one side of the inside of the enclosure 55, there are provided a plurality of rotatable disk base plates 57 which are arranged in the vertical direction closely in parallel with each other. At the center of the disk base plates 57, there is provided a spindle motor (not shown in the drawing) used for turning the disk base plates 57.

On the other side of the enclosure 55, there is provided a head actuator arm assembly 61 which can be turned by the voice coil motor 59. A plurality of suspension arms 63 protruding, in parallel with each other, from the head actuator arm assembly 61 are capable of moving in such a manner that they cross the disk base plate 57 while they form a locus of an arc. At the front end of each suspension arm 63, there is provided a magnetic head slider 65.

Figure 2A:
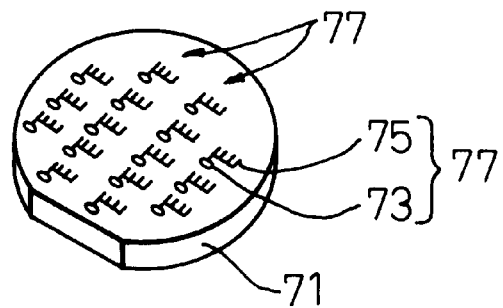
FIG. 2A is a view showing a single body of the wafer base plate.
Figure 2B:
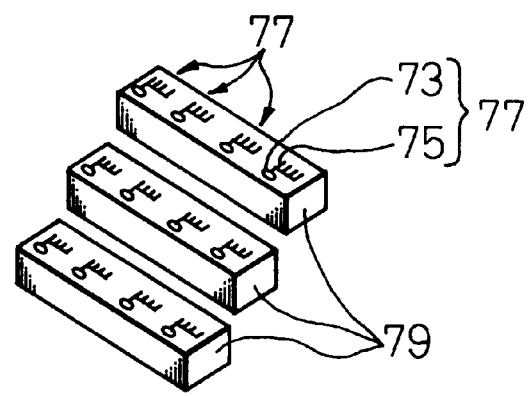
FIG. 2B is a view showing the slider block.
Figure 2C:
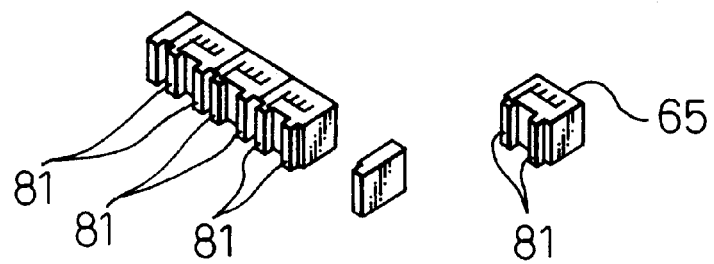
FIG. 2C is a view showing the slider block provided with slider rails.

Referring to FIGS. 2A, 2B, and 2C, a series of manufacturing processes to manufacture the above head slider 65 will be briefly explained below.

First, a plurality of rows of thin film magnetic head elements 77 are formed in orderly rows by means of thin film process on an upper surface of the disk-shaped wafer base plate (head base plate) 71 as shown in FIG. 2A, wherein each thin film magnetic head element 77 is composed of a head element 73 and terminal 75.

Next, as shown in FIG. 2B, a rectangular parallelepiped-shaped (rod-shaped or rectangular) slider block (referred to as a block hereinafter) 79, in which the elements 77 are aligned in a row, is cut out.

In order to form a flying surface pattern on the slider block 79 as the detail is described later and also in order to provide one set of slider rails 81 in one element 77 as shown in FIG. 2C, the slider block 79 is subjected to ion milling etching process, so that a plurality of sets of slider rails 81 are formed on one side of the block 79.

After the flying surface has been formed, lapping is conducted to adjust the size of the element composing the head, and also protrusions composed of a thin film made of hard material such as diamond-like carbon (DLC) are formed on the slider rail.

After that, the slider block is individually cut and separated, so that the slider head 65 can be completed as shown in FIG. 2C.

Figure 3:
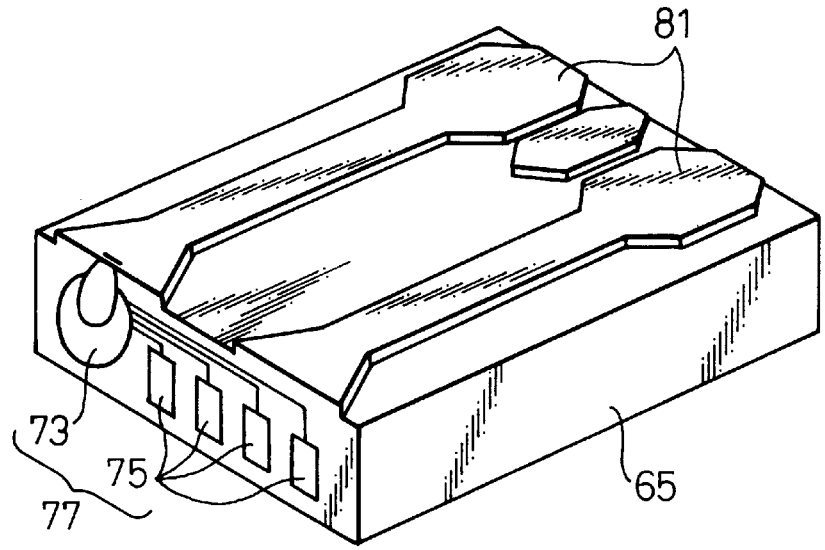
FIG. 3 is a perspective view showing a head slider which is set upside down.

FIG. 3 is a somewhat enlarged perspective view of the above head slider 65 which is set upside down in the view. Two slider rails 81 are formed on the upper surface of the head slider 65. The magnetic head element 77 is formed on the front side end surface of the head slider 65. That is, there are provided one head element section 73 and four terminal sections 75 which include two terminal sections used for two magneto-resistance effect type reproducing heads (usually referred to as an MR head) and two induction type recording head terminal sections.

Figure 4:
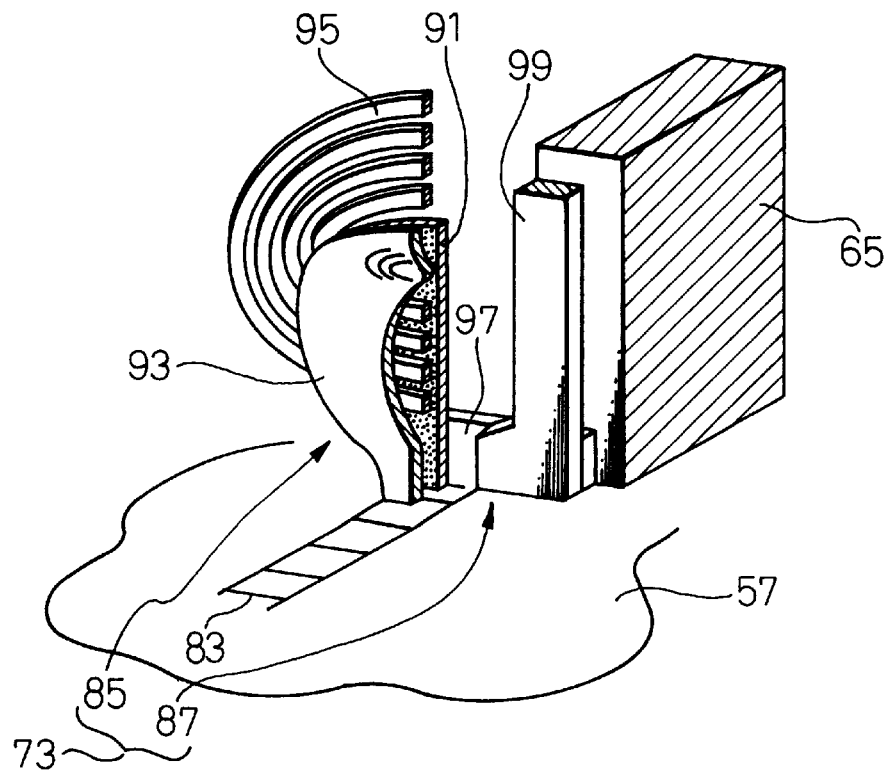
FIG. 4 is a perspective view showing a relation between the primary portion of the head slider and the track of the magnetic disk base plate.

FIG. 4 is a schematic illustration showing a relation between a primary portion of this head slider 65 and a track 83 of the magnetic disk base plate 57. Referring to FIG. 4, the head element section 73 includes: a thin film type recording head section 85 in which recording is conducted; and a reproducing head section (MR head) 87 in which reproduction is conducted.

The recording head section 85 includes: a lower magnetic pole (upper shield layer) 91; an upper magnetic pole 93; and a coil 95 to excite both magnetic poles 91, 93 and record information by a gap portion formed between both magnetic poles 91, 93.

The reproducing head section 87 includes: an MR element section 97 formed on the head slider end surface; and a pair of conductor layers 99 formed on the MR element section 97 at an interval corresponding to the track width, wherein this pair of conductor layers 99 feeds an electric current to the MR element section 97.

Next, a process of forming a flying surface pattern will be explained below. Before the explanation, the flying surface pattern will be briefly explained as follows.

Figure 5:
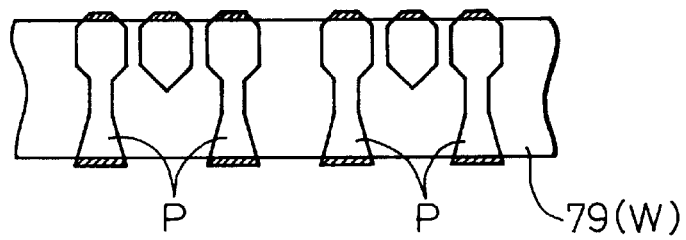
FIG. 5 is a plan view showing an example of the flotation surface pattern formed on the slider block.

FIG. 5 is a plan view of an example of the flying surface pattern (resist pattern) to be formed on the slider block 79. In the view, two long and slender patterns P and one small pattern located between them compose a flying surface pattern of one head slider (65). The long and slender pattern P is shaped like a guppy (a kind of fish). Therefore, the above type flying surface pattern is generally referred to as a guppy pattern.

In the case of a guppy pattern, there is provided a fine flying pattern at the end portion of the slider block. Accordingly, there is a possibility that the fine flying surface pattern is deformed when it comes into contact with a penetrant described later. In order to prevent the occurrence of the above problem, it is necessary to give a special consideration or provide a special manufacturing process.

The method of forming a flying surface pattern of this embodiment will be explained while the process of forming the flying surface pattern is divided into the following seven processes. That is, the process of forming the flying surface pattern is divided into: (i) a slider block arranging process, (ii) a dry resist film laminating process, (iii) a penetrant coating, penetrating and baking process, (iv) a developing and laminated film removing process, (v) a relaminating, exposing and developing process, (vi) an ion mill process, and (vii) a cleaning process. Detail of the formation of the flying surface pattern will be explained below in the above order.

(i) SLIDER BLOCK ARRANGING PROCESS

Figure 6:
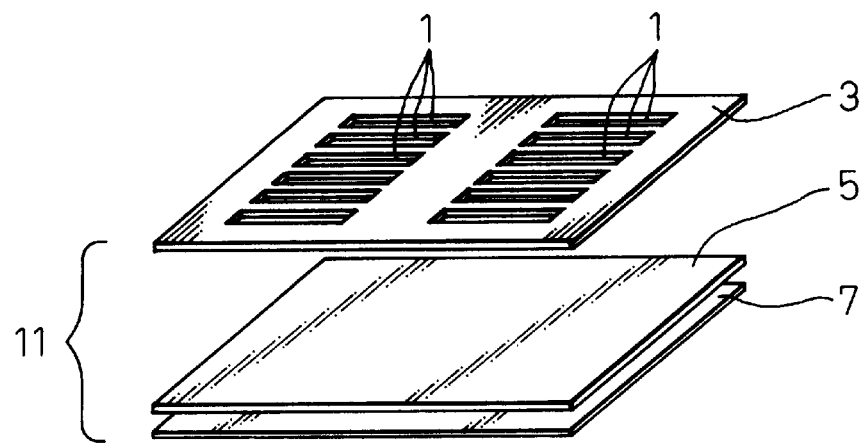
FIG. 6 is an exploded perspective view of an example of the arrangement jig relating to the present invention.
Figure 7:
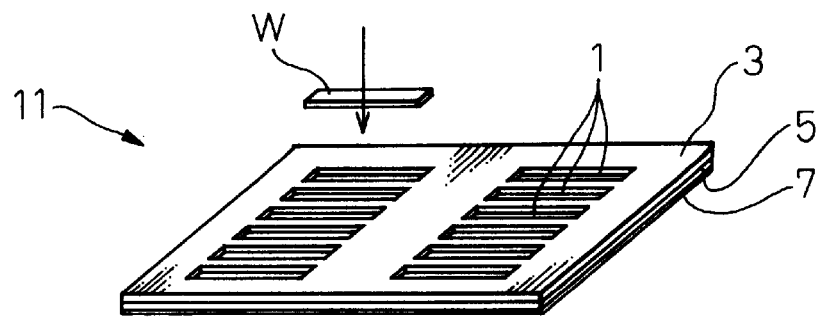
FIG. 7 is a perspective view showing an assembling state of the arrangement jig shown in FIG. 6.

As shown in FIG. 6, there are prepared a thin guide plate 3 having a large number of penetrating accommodation holes 1 in which long and slender rectangular parallelepiped slider blocks (referred to as blocks hereinafter) W are accommodated, an adhesive rubber plate 5, and a resin sheet 7. The sheet 7 is not limited to a resin sheet, but it may be a metallic sheet. As shown in FIG. 7, these three members 3, 5, 7 are integrated into one body in this order by the action of an adhesive force of the rubber plate 5, and the thus integrated body composes an arrangement jig 11.

Blocks W are accommodated in the accommodating holes 1 formed on the guide plate 3 of this arrangement jig 11. The thus accommodated blocks W are contacted and engaged with the surface of the rubber plate 5 and held by an adhesive force of the rubber plate 5.

When the guide plate 3 is thicker than the slider block, there is a possibility that the pattern mask comes into contact with the guide plate 3 in the process of pattern exposure. In order to avoid the occurrence of the above problem, the guide plate 3 is formed to be thinner than the block W by 15 to 30 $\mu$m, for example, the guide plate 3 is formed by a metallic plate, the thickness of which is 0.4 mm and, for example, the guide plate 3 can be formed by a copper plate, the thickness of which is 0.4 mm. The reason why a copper plate is used is that the heat conduction of a copper plate is high so that heat can be quickly conducted in the process of ion milling. Another reason why a copper plate is used is that the manufacturing cost can be reduced when the copper plate is subjected to photoetching and press-forming.

The rubber plate 5 is made of material with a good adhesive property, the surface of which is smooth and, for example, the rubber plate 5 can be made of a silicon rubber plate or a fluorine rubber plate, the thickness of which is 2 mm.

Since the resin sheet 7 is exposed to high temperatures of 100 to 110° C. in the manufacturing process, it is made of a polyimide resin sheet, the thickness of which is 0.2 mm, which can resist the high temperatures. It is possible to use a metallic sheet instead of the resin sheet.

Since the height of the arrangement jig can be extremely reduced as described above, it is possible to provide a secondary effect that the sizes of various apparatus to process the arrangement jig can be reduced.

Figure 8:
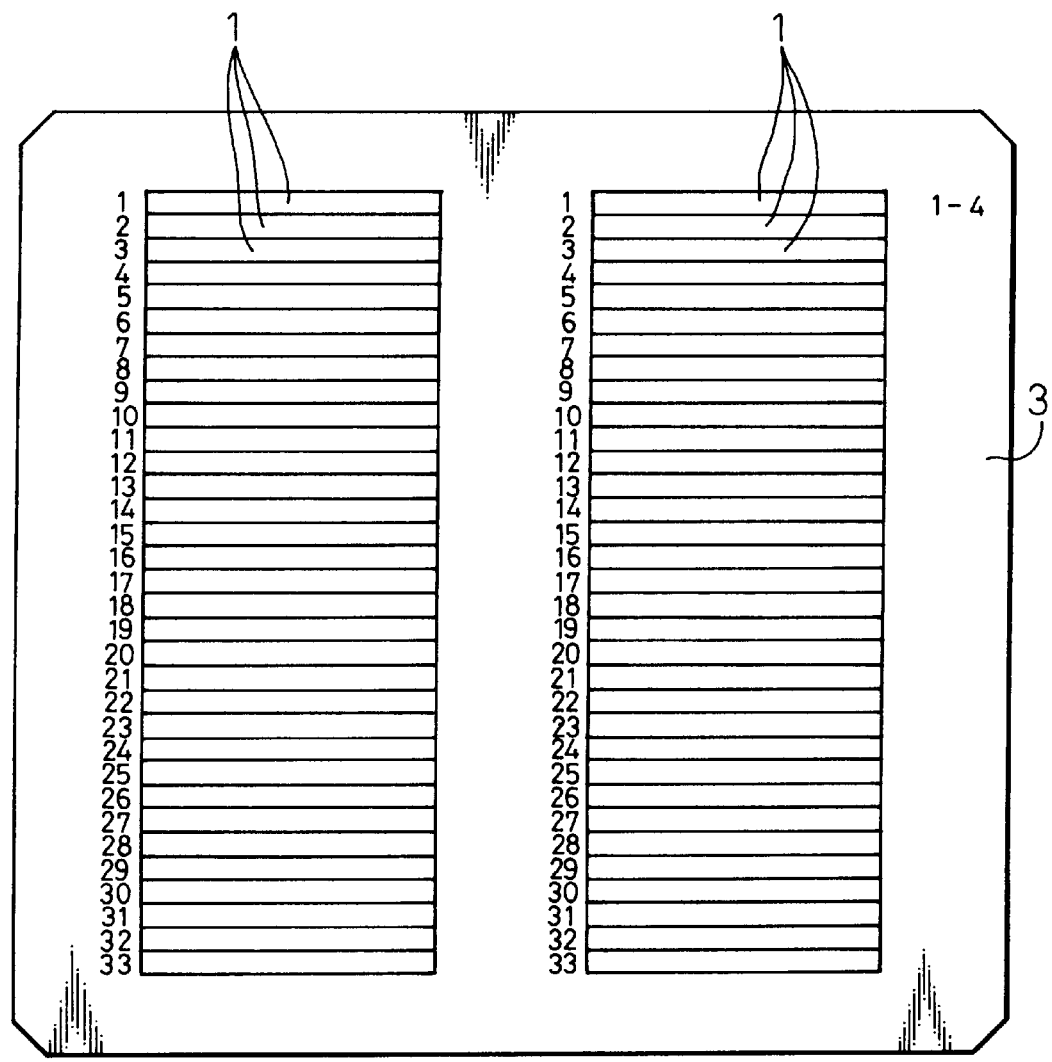
FIG. 8 is a plan view of the guide plate.

The accommodating holes 1 which penetrate the guide plate 3 are regularly arranged as shown in FIG. 8, that is, a plurality of rows of accommodating holes 1 are formed on the guide plate 3 (two rows of accommodating holes 1 are formed in the example shown in the view). Each accommodating hole 1 is formed into a substantial rectangle corresponding to the profile of block W so that the block W can be loosely restricted by the accommodating hole 1 in the case of accommodation of the block W.

Figure 9:
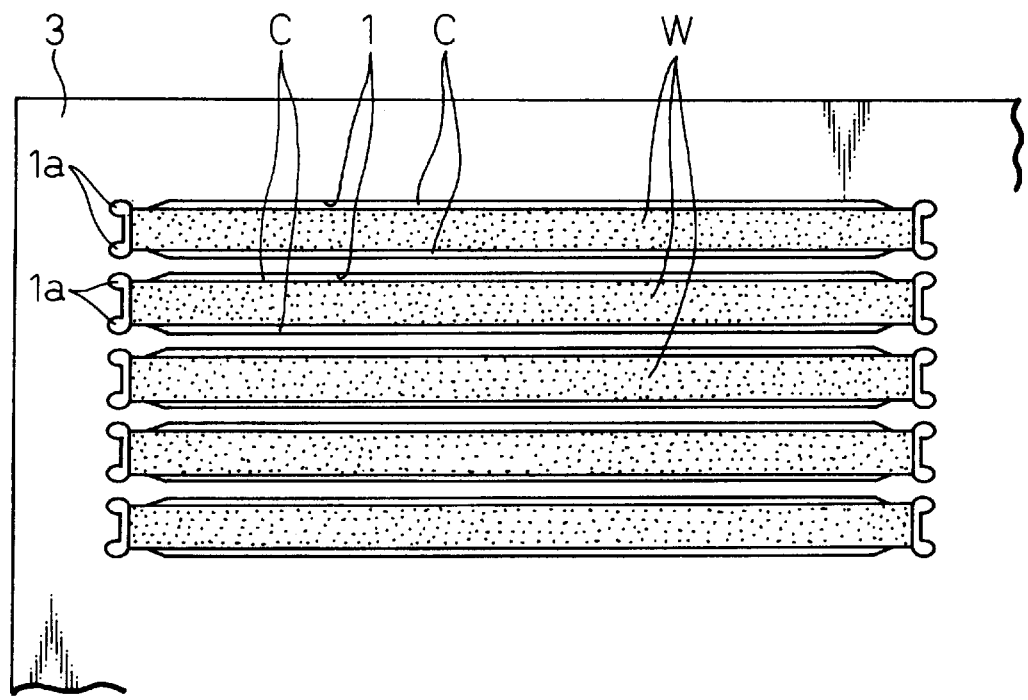
FIG. 9 is an enlarged plan view showing an example of the primary portions of the accommodating holes formed on the guide plate.
Figure 10:
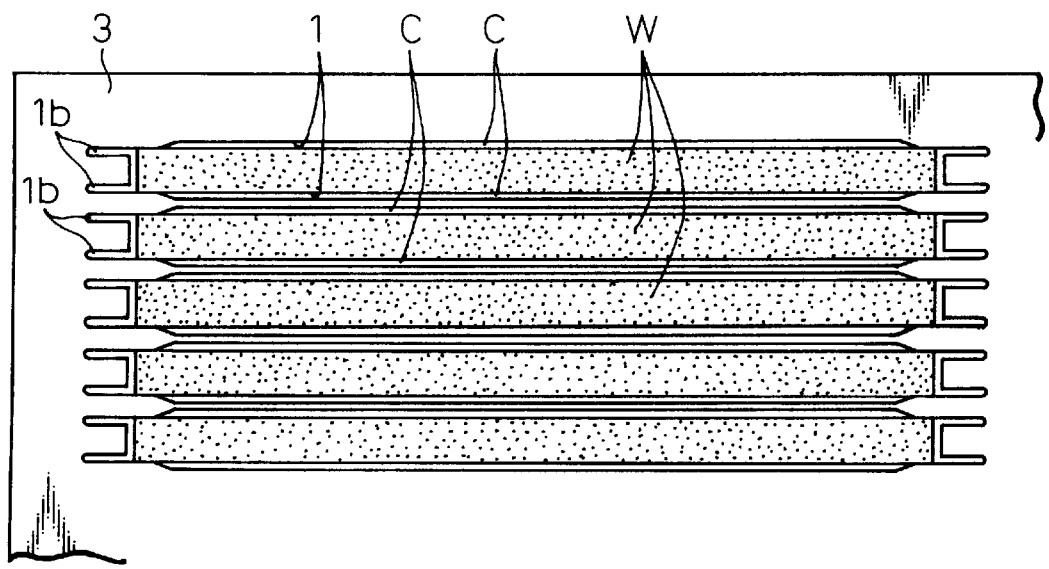
FIG. 10 is an enlarged plan view showing another example of the primary portions of the accommodating holes formed on the guide plate.

Other details are described as follows. As exemplarily shown in FIGS. 9 and 10, in order to allow a penetrant such as a resist liquid to easily penetrate, clearances C of 50 to 100 $\mu$m are formed between both long sides of the accommodating hole and the block W, except for constricted portions at the four corners of the accommodating hole 1, that is, except for the portions of the accommodating holes used for restricting and positioning the slider block.

At the four corners of the accommodating hole 1 of the guide plate 31 there are provided substantially circular run-off portions 1a (shown in FIG. 9) which are connected to the accommodating hole 1, or alternatively there are provided rod-shaped run-off portions 1b (shown in FIG. 10) so that the four corners of the block, which are fragile, cannot be damaged.

The above penetration is caused by a capillary phenomenon. The capillary phenomenon is effectively caused in a long and slender recess or hole. For this reason, the run-off portion 1b (shown in FIG. 10) is formed into, for example, a rod-shape.

(ii) DRY RESIST FILM LAMINATING PROCESS

Figure 11:
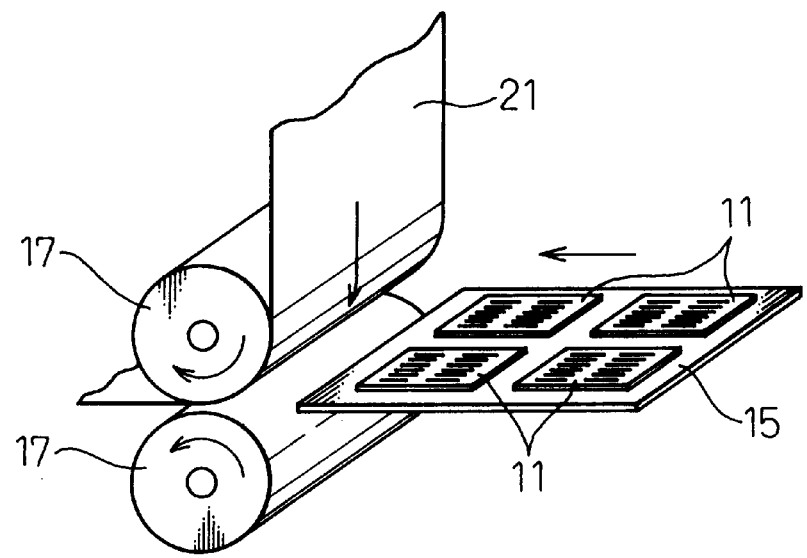
FIG. 11 is a perspective view showing a laminating process.

As shown in FIG. 11, under the condition that a plurality of blocks W are arranged in the arrangement jig 11, several arrangement jigs 11 (in the example shown in the drawing, four arrangement jigs) are set on a predetermined laminating base plate 15. Then all the members are fed between a pair of laminating rollers 17 of a laminating unit, not shown in the drawing, so that a dry resist film (laminate film) 21 is made to closely adhere onto an upper surface of the laminating base plate 15, that is, the laminate film is laminated on the upper surface by heat and pressure.

Figure 12:
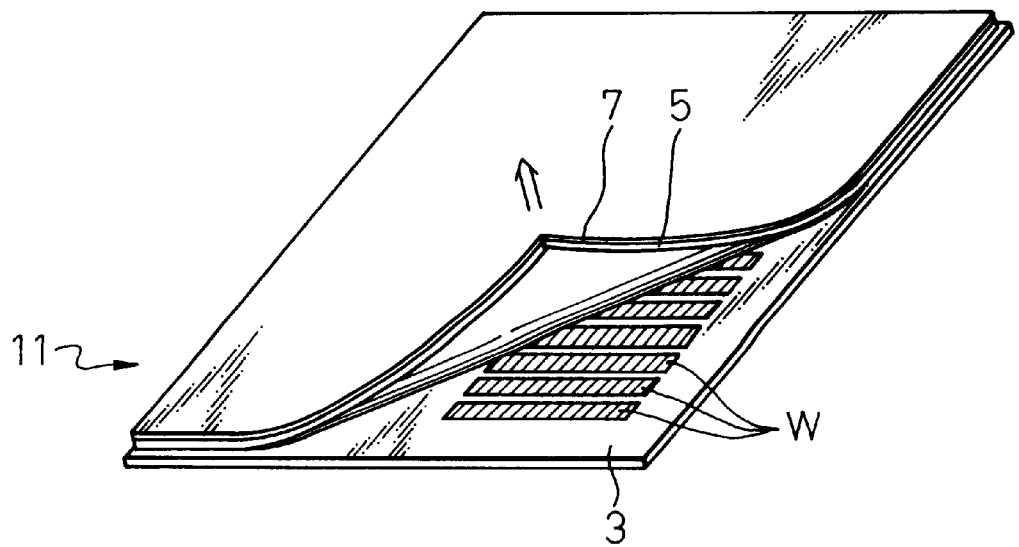
FIG. 12 is a perspective view showing a state in which the rubber plate and resin sheet are peeled off from the guide plate.
Figure 13:
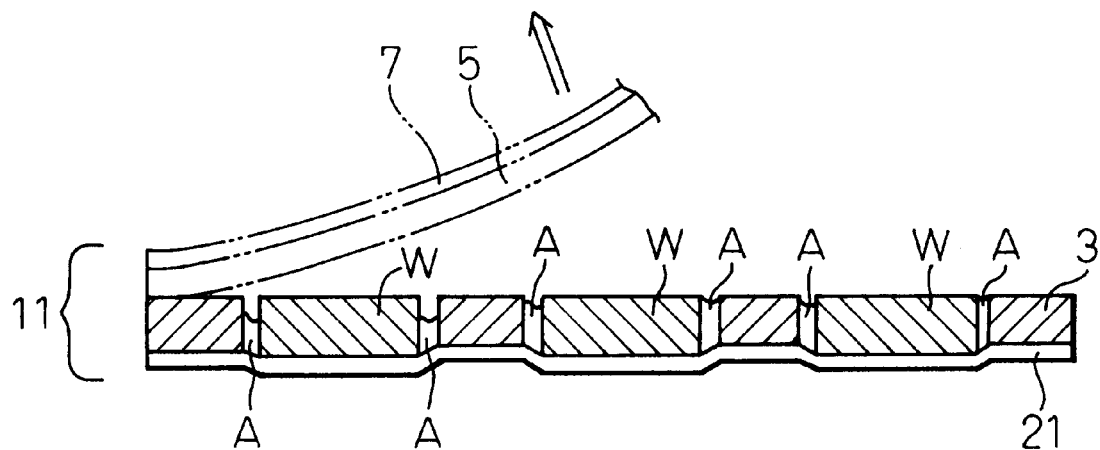
FIG. 13 is a side view of FIG. 12.

After the laminating processing has been completed, the arrangement jig 11 is inverted. As shown in FIGS. 12 and 13, the rubber plate 5 and the resin sheet 7 are peeled off from the guide plate 3.

In order to prevent the resist film from peeling off locally when thermal deformation of the guide plate 3 is caused, immediately after the completion of laminating processing, the rubber plate 5 and the resin sheet 7 are peeled off from the guide plate 3 without giving an unnecessarily high force to the guide plate 3.

In this connection, when the above rubber sheet 5 and the resin sheet 7 are used, the following advantages can be provided. (a) Since the blocks W are held by the adhesive force of the rubber plate 5, blowing with nitrogen gas can be conducted for cleaning before the laminating processing while neither the block positions are changed nor the blocks are peeled off. (b) It is possible to easily peel off the rubber plate 5 and the resin sheet 7 without any difficulty. Therefore, the adhesive condition between the laminate film 1 and the blocks W is not affected, and the rubber plate 5 can be recycled. (c) Since the resin sheet 7 is used, the rubber plate 5 does not directly adhere onto the laminating base plate 15 in the laminating process. When only the guide plate 3 and the rubber plate 5 are arranged, deformation tends to occur. Therefore, for the purpose of reinforcement, that is, in order to enhance the rigidity, the resin sheet 7 is used.

(iii) PENETRANT COATING, PENETRATING AND BAKING PROCESS

As shown in FIG. 13, a penetrant A, for example, a photosensitive resist liquid (a positive type resist liquid with a viscosity of 38 CP) is coated on the upper surface (actually, the back surface) of the guide plate 3 which is set upside down. This penetrant A appropriately penetrates into the clearances (C, 1a, 1b) between the accommodating holes 1 and the blocks W and is left for 30 seconds to 2 minutes.

A redundant resist liquid on the surface is wiped away with gauze. After that, baking is conducted at 100° C. for 30 minutes, so that the resist liquid can be hardened by heat.

Instead of the above resist liquid, an adhesive agent, for example, a flash adhesive agent of cyano-acrylate can be used as the penetrant A. In this case, the adhesive agent easily gets into the clearances (C, 1a, 1b) between the accommodating holes 1 of the guide plate 3 and the blocks W by the capillary phenomenon. After a hardening time of 10 minutes, the redundant adhesive agent is wiped away with gauze. Further, after about 10 minutes have passed, the guide plate and the block surface are completely wiped with gauze soaked with acetone.

In this case, even if the penetrant dissolves out and the side of the block is somewhat exposed, the side of the block is protected and coated as usual when a view is taken from the pattern formation side of the block W, that is, when a view is taken from the lower side in FIG. 13. In other words, it is impossible for ions to intrude onto the side of the block. Therefore, no problems are caused in the protection of the side of the block. All the worker must do is to clean the block W mechanically. Therefore, much psychological stress is not given to the worker, and he can easily perform the work.

(iv) DEVELOPING AND LAMINATE FILM REMOVING PROCESS

Figure 14:
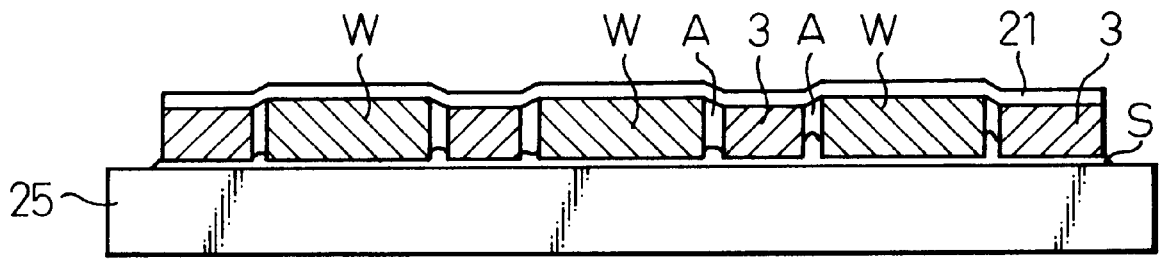
FIG. 14 is a side view of the guide plate and block fixed onto the ceramic base plate while the laminate film side is set upward.

After the penetrant A has been hardened, that is, after the resist liquid has been hardened or the flash adhesive agent has been hardened, this inverted guide plate 3 and the block W are returned to the initial state. Then, the guide plate 3 and the block W are made to adhere onto a base plate as shown in FIG. 14. For example, the guide plate 3 and the block W are made to adhere onto the ceramic base plate 25 by the action of wax S, the softening point of which is not lower than 70° C.

Figure 15:
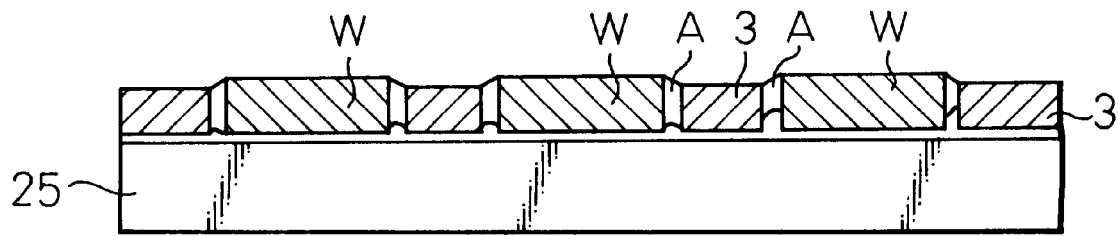
FIG. 15 is a side view of the guide and block in a state in which the laminate film is removed.

Then, the laminate film (dry resist film) 21, which covers the upper surface of the guide plate 3 and the block W, is removed by development as shown in FIG. 15.

In this stage, the clearance between the accommodating hole 1 on the guide plate 3 and the block W is closed by the penetrant A. In other words, the surface of the clearance between the accommodating hole 1 and the block W is closed by the penetrant A. Therefore, the side of the block W is substantially completely protected and coated. The reason why the laminate film 21 is removed in this process is that the laminate film 21 is degenerated by the penetrant A so that the guppy pattern is affected by the degeneration of the laminate film 21.

(v) RELAMINATION, EXPOSING AND DEVELOPING PROCESS

Figure 16:
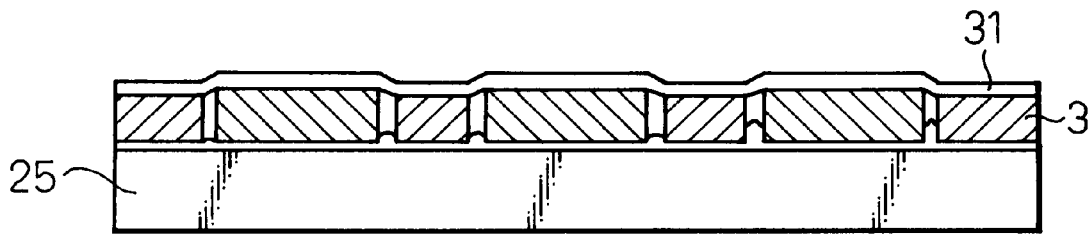
FIG. 16 is a side view of the guide and block in a state in which they are coated again with the laminate film.
Figure 17:
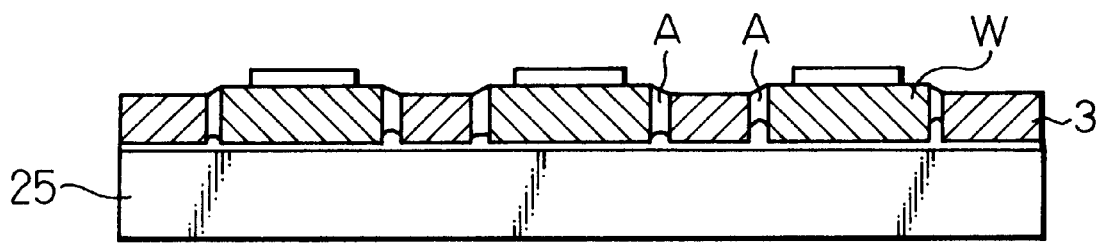
FIG. 17 is a side view of the block and guide plate in a state in which the resist film pattern is exposed to light and developed.

As shown in FIG. 16, the upper surfaces of the guide plate 3 and the block W arranged on the ceramic base plate 25 are coated again with a laminate film 31 in the same manner as that of the above laminating process. A resist film pattern corresponding to the predetermined flying surface pattern is exposed and developed as shown in FIG. 17. When the lamination is conducted again as described above, it is possible to obtain a perfect guppy pattern which is not affected by the penetrant.

(vi) ION MILL PROCESS

Figure 18:
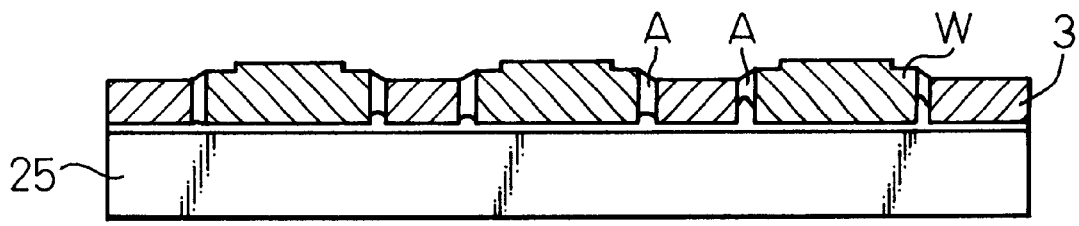
FIG. 18 is a side view of the block and guide when the flotation surface pattern is formed.

The above resist film pattern is formed on the upper surface (flying surface) of the block W by the ion milling method as shown in FIG. 18. This flying surface pattern is the same as the guppy pattern shown in FIG. 5.

(vii) CLEANING PROCESS

Finally, by ultrasonic cleaning conducted in an organic solvent such as acetone, the penetrant filled in the clearance between the accommodating hole 1 on the guide plate 3 and the block W is removed, and then a plurality of blocks W are removed from the guide plate 3. Due to the foregoing, the flying surface pattern formation on the block is completed. In the above manufacturing process, the guide plate 3 is seldom damaged. Therefore, it is possible to use the guide plate 3 again. However, in order to maintain the dimensional accuracy high, it is preferable to discard the guide plate 3 after it has been used several times. In this connection, explanations of the process to be conducted from now on will be omitted because they are the same as the explanations made before.

Figure 19:
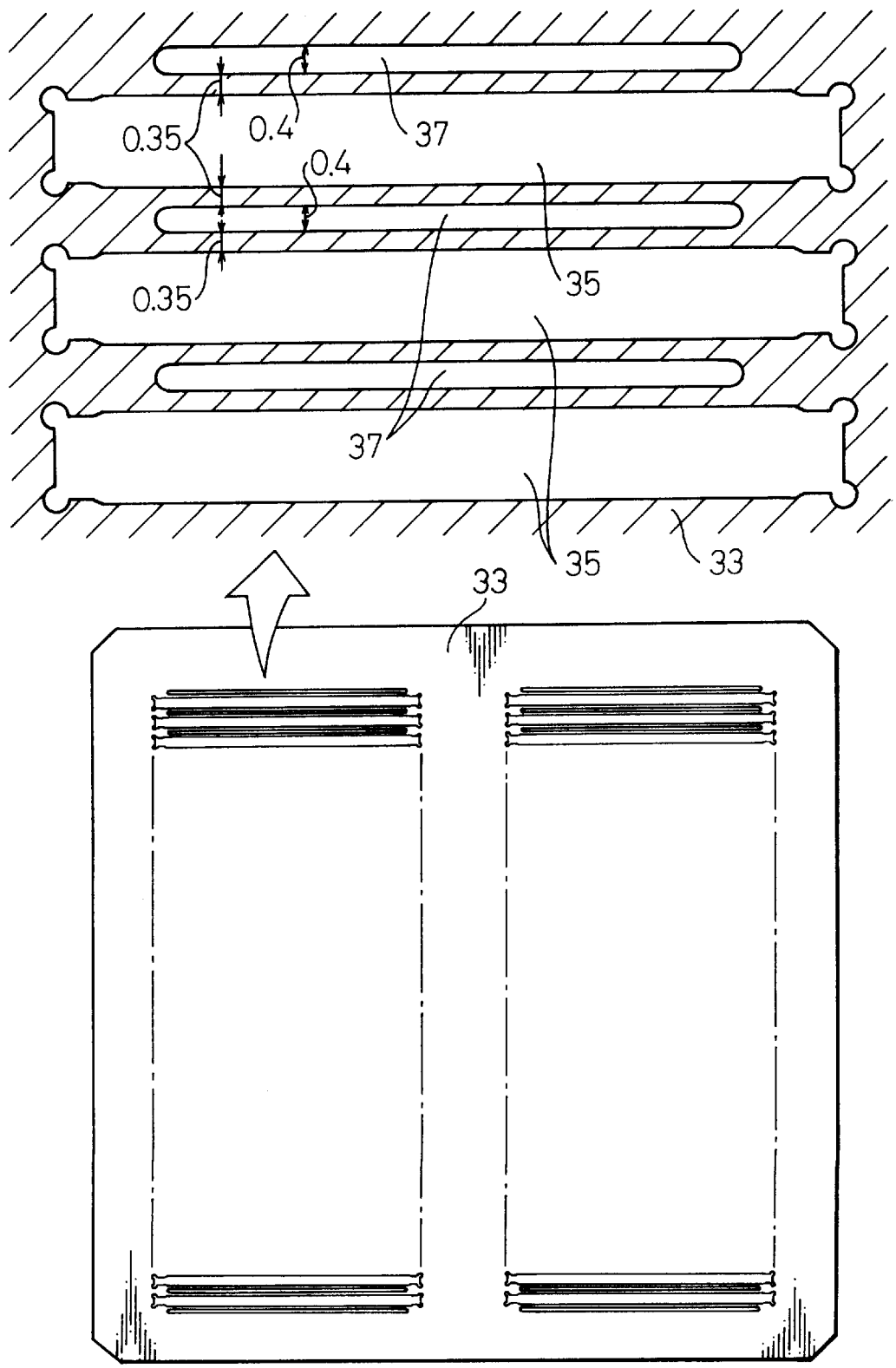
FIG. 19 is a plan view of an example in which the guide plate is changed.

In this connection, a variation of the above guide plate 3 is shown in FIG. 19. The size and profile of the accommodating hole 35 on the guide plate 33 shown in FIG. 19 are the same as those of the accommodating hole 1 on the guide plate 3 shown in FIG. 9. However, a space formed between the accommodating holes 35 is a little larger, for example, the width of the space formed between the accommodating holes 35 is 1.1 mm. In this extended space between the accommodating holes 35 on the guide plate 33, there is formed a long and slender slit 37, the width of which is, for example, 0.4 mm.

This long and slender slit 37 has a function to absorb a deformation of the guide plate which is caused when the slider block W to be accommodated in the accommodating hole 35 is deformed and curved. By this function of the long and slender slit 37 to absorb a deformation of the guide plate, deformation of one slider block W does not affect other slider blocks W.

In the process described in item (iii), that is, in the coating and penetrating process of the hardening penetrant A (for example, resist liquid), the slider block W is curved and deformed when the liquid A is hardened.

When the slider block W is short and the guide plate 33 is thick, it is difficult for the above problem to occur. However, when the slider block W is long and the guide plate 33 is thin, specifically when the thickness of the guide plate 33 is not more than 0.3 mm, the slider block W is deformed, and this deformation affects the adjacent slider block W. Due to the accumulation of this deformation, there is a possibility that a large number of slider blocks W may become defective.

For the purpose of solving the above problems, it is very effective to form a long and slender slit 37 in a space on the guide plate between the slider blocks. Deformation of the slider block W is effectively absorbed and relieved by the action of this slit 37, and other slider blocks W are seldom affected by the deformation. In other words, when this guide plate 37 is used, the percentage of defective slider blocks W can be remarkably decreased.

As explained above, the block side can be simply and sufficiently protected in the process of etching according to the present invention. Therefore, it is possible to simply mass-produce magnetic head sliders of high quality at low manufacturing cost.

It is to be understood that the invention is by no means limited to the specific embodiments illustrated and described herein, and that various modifications thereof may be made which come within the scope of the present invention as defined in the appended claims.

What is claimed is:

1. A method of manufacturing a magnetic head slider by which a flying surface pattern is formed on one surface of a long and slender rectangular parallelepiped slider block in which a plurality of thin film magnetic head elements are aligned in a row, comprising the steps of:

(i) preparing an arrangement jig including a guide plate on which a plurality of penetrating accommodation holes for accommodating slider blocks are formed and also including an adhesive rubber plate which adheres onto a lower surface of the guide plate by its adhesive force; and accommodating the slider blocks in the accommodation holes on the guide plate of the arrangement jig in such a manner that the surface of each slider block on which a pattern is to be formed is directed upward and each slider block is fixed by an adhesive force of the rubber plate;

(ii) peeling off the rubber plate after an upper surface of the arrangement jig has been covered with film;

(iii) pouring and penetrating a hardening liquid into clearances formed between the accommodation holes on the guide plate and the slider blocks so as to coat the sides of the slider blocks and connect the slider blocks with the guide plate;

(iv) fixing the entire guide plate onto a base plate after the penetrating liquid has been hardened; and (v) forming a pattern on the surface of each slider block on which the pattern is to be formed by means of exposing, developing and etching.

2. The method of manufacturing a magnetic head slider according to claim 1, wherein the guide plate is thinner than the slider block.

3. The method of manufacturing a magnetic head slider according to claim 1, wherein the guide plate is made of a metallic plate.

4. The method of manufacturing a magnetic head slider according to claim 1, wherein the rubber plate is an adhesive plate made of adhesive material such as silicon rubber or fluorine rubber.

5. The method of manufacturing a magnetic head slider according to claim 1, wherein clearance formed between each accommodation hole on the guide plate and each slider block accommodated in the accommodation hole is larger than a clearance formed in a portion of the accommodation hole in which the slider block is positioned and restricted so that the penetration of liquid can be facilitated in step (iii).

6. The method of manufacturing a magnetic head slider according to claim 1, wherein a run-off portion connected to the accommodation hole is formed at each of the four corners of the accommodation hole of the guide plate so that the slider block cannot be broken by the contact with the accommodation hole and/or the penetration of liquid can be facilitated in step (iii).

7. The method of manufacturing a magnetic head slider according to claim 1, wherein the guide plate is thinner than the slider block.

8. The method of manufacturing a magnetic head slider according to claim 1, wherein the hardening penetrating liquid used in step (iii) is a photosensitive resist liquid.

9. The method of manufacturing a magnetic head slider according to claim 1, wherein the hardening penetrating liquid used in step (iii) is a cyano-acrylate adhesive agent.

10. The method of manufacturing a magnetic head slider according to claim 1, step (v) further including the steps of: removing a film which covers a surface on which the pattern of the slider block is to be formed; coating a resist film; and conducting exposure, development and etching on the resist film so as to form the pattern.

11. The method of manufacturing a magnetic head slider according to claim 1, wherein a resin sheet or a metallic sheet to protect the rubber sheet is made to adhere onto a lower surface of the arrangement jig by an adhesive force of the rubber plate.

12. The method of manufacturing a magnetic head slider according to claim 1, wherein said step of preparing an arrangement jig further includes forming a long and slender slit in said guide plate and between the arrangement holes to absorb the deformation of the slider block.

13. A method of manufacturing a magnetic head slider by using a flying surface pattern is formed on one surface of a slider block having a plurality of thin film magnetic head elements aligned in a row, said method comprising the steps of:

(i) preparing an arrangement holder including a guide member on which a plurality of penetrating accommodation holes for accommodating slider blocks are formed and also including an adhesive rubber member which adheres onto a lower surface of the guide plate by its adhesive force; and accommodating the slider blocks in the accommodation holes on the guide member of the arrangement holder in such a manner that the surface of each slider block on which a pattern is to be formed is directed upward and each slider block is fixed by an adhesive force of the rubber member;

(ii) peeling off the rubber member after an upper surface of the arrangement holder has been covered with film;

(iii) pouring and penetrating a hardening liquid into clearances formed between the accommodation holes on the guide member and the slider blocks so as to coat the sides of the slider blocks and connect the slider blocks with the guide member;

(iv) fixing the entire guide member onto a base plate after the penetrating liquid has been hardened; and (v) forming a pattern on the surface of each slider block on which the pattern is to be formed by means of exposing, developing and etching.

14. A slider-block holding member used in the process of holding a slider block comprising:

a guide member having a penetrating hole to accommodate a slide block; and a rubber member for holding said guide member by its adhesive force, said rubber member being configured and disposed for easily peeling off from the guide member.

15. The slide-block holding member according to claim 14, wherein said guide member comprises a metal plate.

16. The slider-block holding member according to claim 14, wherein said rubber member comprises one of silicon rubber plate and a fluoric plate.

17. The slider-block holding member according to claim 14, further comprising a sheet for protecting the rubber member.

18. The slider-block holding member according to claim 14, wherein said rubber member is configured and disposed so that peeling off said rubber member from said guide member does not damage said guide member or said slider block.

* * * * *

UNITED STATES PATENT AND TRADEMARK OFFICE
CERTIFICATE OF CORRECTION

PATENT NO. : 6,129,855  
DATED : October 10, 2000  
INVENTOR(S) : Sawada et al.

Page 1 of 1

It is certified that error appears in the above-identified patent and that said Letters Patent is hereby corrected as shown below:

Column 10,  
Line 11, delete "coat the" and insert -- coat -- therefor.  
Line 12, before "the slider" insert -- each of --.  
Line 38, delete "the four" and insert -- four -- therefor.  
Line 67, delete "absorb the" and insert -- absorb a -- therefor.

Column 11,  
Line 24, before "the slider" insert -- each of --.

Column 12,  
Line 7, delete "slide" and insert -- slider -- therefor.  
Line 11, delete "the guide" and insert -- said guide -- therefor.  
Line 13, delete "slide-block" and insert -- slider block -- therefor.

Signed and Sealed this

Twenty-fifth Day of December, 2001

*Attest:*

*Attesting Officer*

JAMES E. ROGAN  
*Director of the United States Patent and Trademark Office*